United States Patent
Bruno, Jr. et al.

(10) Patent No.: US 9,628,332 B2
(45) Date of Patent: Apr. 18, 2017

(54) RESOURCE ALLOCATION TO GAME TITLES IN A REMOTE GAMING ENVIRONMENT

(71) Applicant: MICROSOFT CORPORATION, Redmond, WA (US)

(72) Inventors: John Peter Bruno, Jr., Snoqualmie, WA (US); Donald James McNamara, Woodinville, WA (US); Ashok Chandrasekaran, Redmond, WA (US); Christopher Lane Boedigheimer, Redmond, WA (US); Per-Ola Anders Orvendal, Carnation, WA (US); Joseph Cusimano, Carnation, WA (US); Scott Q. Longstreet, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

(21) Appl. No.: 13/897,876

(22) Filed: May 20, 2013

(65) Prior Publication Data

US 2014/0344457 A1 Nov. 20, 2014

(51) Int. Cl.
*G06F 15/173* (2006.01)
*H04L 12/24* (2006.01)
(Continued)

(52) U.S. Cl.
CPC .......... *H04L 41/0816* (2013.01); *A63F 13/12* (2013.01); *G06F 9/505* (2013.01);
(Continued)

(58) Field of Classification Search
USPC .................................................. 709/223–226
See application file for complete search history.

(56) References Cited

U.S. PATENT DOCUMENTS 6,747,985 B1 * 6/2004 Lovette .................. H04L 12/43
370/460
8,316,098 B2 * 11/2012 Luna et al. ................... 709/216
(Continued)

FOREIGN PATENT DOCUMENTS

FR 2922120 A1 4/2009

OTHER PUBLICATIONS

Weng, et al., "Dynamic Resource Allocation for MMOGs in Cloud Computing Environments", In 8th International Wireless Communications and Mobile Computing Conference, Aug. 27, 2012, 5 pages.
(Continued)

*Primary Examiner* — Scott B Christensen
(74) *Attorney, Agent, or Firm* — Shook, Hardy & Bacon L.L.P.

(57) ABSTRACT

Embodiments of the present invention monitor and dynamically allocate computing resources to a game service. A game service provides a remote gaming environments to which users connect over a wide area network, such as the internet. A game session runs a single instance of a game title. The game session runs the video game code responsible for creating the playing experience for the users. In another embodiment, the number of active game sessions is monitored and computing resources are allocated dynamically as the number of sessions increases or decreases.

14 Claims, 10 Drawing Sheets

(51) Int. Cl.
*A63F 13/30* (2014.01)
*H04L 29/08* (2006.01)
*G06F 9/50* (2006.01)

(52) U.S. Cl.
CPC .... *H04L 67/1008* (2013.01); *A63F 2300/535* (2013.01); *A63F 2300/5533* (2013.01); *G06F 2209/5022* (2013.01); *H04L 67/148* (2013.01)

(56) References Cited

U.S. PATENT DOCUMENTS

| | | | |
|---|---|---|---|
| 8,556,724 B2* | 10/2013 | Dale et al. | 463/42 |
| 2003/0169460 A1* | 9/2003 | Liao | H04W 28/20 358/426.08 |
| 2009/0318235 A1* | 12/2009 | Ashida | A63F 13/12 463/42 |
| 2010/0304860 A1 | 12/2010 | Gault et al. | |
| 2010/0332658 A1* | 12/2010 | Elyashev | 709/226 |
| 2012/0102185 A1* | 4/2012 | Fernandes | 709/224 |
| 2013/0003800 A1* | 1/2013 | Finkelstein | H04N 21/23655 375/224 |
| 2013/0072308 A1 | 3/2013 | Peck et al. | |
| 2014/0179427 A1* | 6/2014 | Miura | A63F 13/00 463/31 |

OTHER PUBLICATIONS

De Sousa Adaixo, Miguel Antonio Moreira, "Cloud DReAM—Dynamic Resource Allocation Management for Large Scale MMOGs", Dissertation Submitted to Obtain the Master Degree in Information Systems and Computer Engineering, Nov. 2012, 90 pages.

Nae, et al., "Massively Multiplayer Online Games on Unreliable Resources", In 11th Annual Workshop on Network and Systems Support for Games, Nov. 22, 2012, 2 pages.

Nae, et al., "Cost-efficient Hosting and Load Balancing of Massively Multiplayer Online Games", In 11th IEEE/ACM International Conference on Grid Computing, Oct. 25, 2010, 8 pages.

Briceno, et al., "Robust Resource Allocation in a Massive Multiplayer Online Gaming Environment", In Proceedings of the 4th International Conference on Foundations of Digital Games, Apr. 26, 2009, 8 pages.

Marzolla, et al., "Dynamic Resource Provisioning for Cloud-Based Gaming Infrastructures", In ACM Computers in Entertainment, vol. 10, Issue 3, Article 4, Dec. 2012, 28 pages.

Iosup, et al., "CAMEO: Enabling Social Networks for Massively Multiplayer Online Games through Continuous Analytics and Cloud Computing", In 9th Annual Workshop on Network and Systems Support for Games, Nov. 16, 2010, 6 pages.

Knutsson, et al., "Peer-to-Peer Support for Massively Multiplayer Games", In Twenty-third Annual Joint Conference of the IEEE Computer and Communications Societies, Mar. 7, 2004, 12 pages.

"International Search Report and Written Opinion Received for Patent Application No. PCT/US2014/038682", Mailed Date: Sep. 18, 2014, 12 Pages.

"Second Written Opinion Received for PCT Application No. PCT/US2014/038682", mailed Apr. 21, 2015, 8 pages.

Shaikh, et al., "Implementation of a Service Platform for Online Games", In Proceedings of 3rd ACM SIGCOMM Workshop on Network and System Support for Games, Aug. 30, 2004, 5 pages.

Ye, et al., "System-Performance Modeling for Massively Multiplayer Online Role-Playing Games", In IBM Systems Journal, vol. 45, Issue 1, Jan. 1, 2006, 15 pages.

"International Preliminary Report on Patentability Received for PCT Application No. PCT/US2014/038682", mailed Jul. 30, 2015, 9 pages.

* cited by examiner

RESOURCE ALLOCATION TO GAME TITLES IN A REMOTE GAMING ENVIRONMENT

BACKGROUND

Video games have become increasingly popular. Some video games allow multiple players to interact within the same game using client devices that are remotely located from each other. For example, in a peer-to-peer gaming environment, multiple clients throughout the world could connect over a network to a game hosted by one of the client devices. In another example, a server may host a game that multiple client devices join over a wide area network.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention monitor and dynamically allocate computing resources to a game service based on the number of active game sessions. A game service provides a remote gaming environment to which users connect over a wide area network, such as the Internet. For example, the game service could utilize a series of servers, or a series of server farms located throughout the world to host video games. Players then connect to the gaming service using a variety of different client devices including game consoles, smartphones, tablets, personal computers, and other computing devices.

Embodiments of the present invention run game titles that are written for the game service. Titles written for the game service do not use code that manages server resources or other computing resources. Instead, the computing resources allocated to the game service are dynamically updated as needed by monitoring changes in game service compute usage characteristics. In one embodiment, the total number of game sessions running is monitored.

A game session runs a single instance of a game title. A game session may be shared by many players. The game session runs the video game code responsible for creating the playing experience for the users. Hundreds or thousands of game sessions may be running at one time within the game service.

BRIEF DESCRIPTION OF THE DRAWINGS

Embodiments of the invention are described in detail below with reference to the attached drawing figures, wherein.

DETAILED DESCRIPTION

Figure 1:
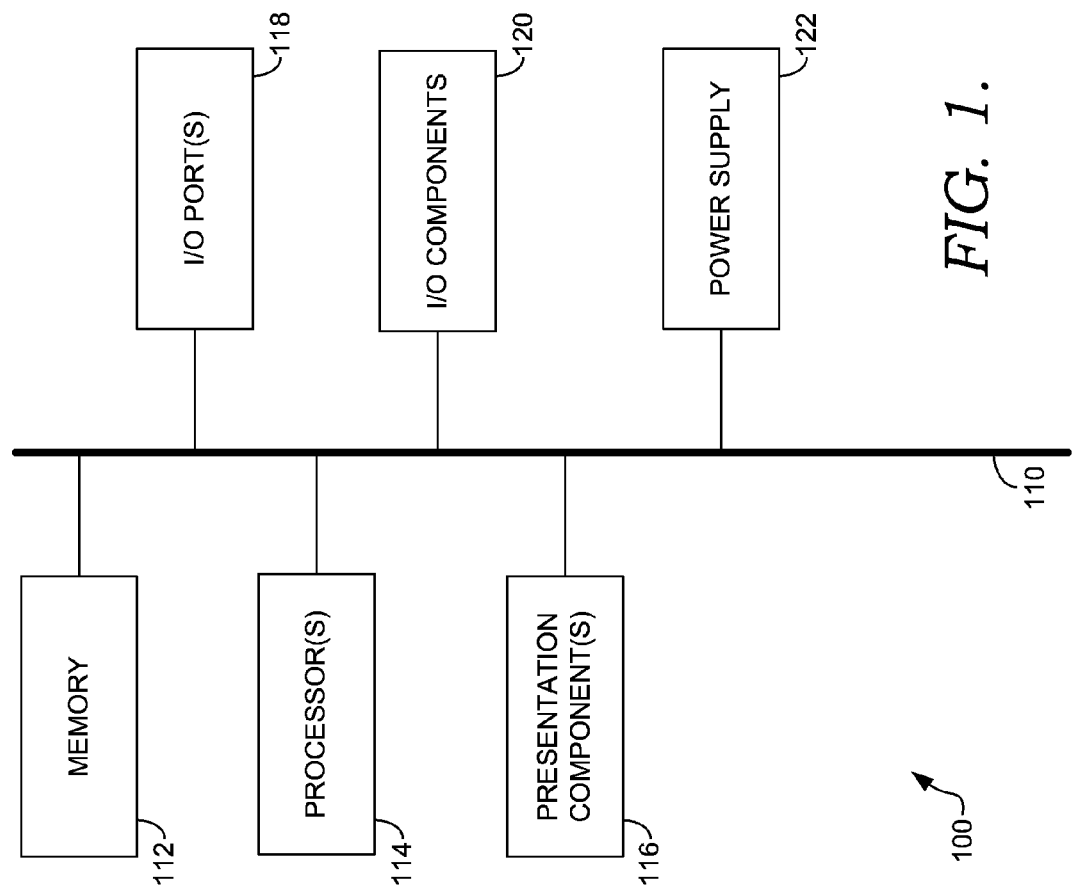
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention monitor and dynamically allocate computing resources to a game service. The game service provides a remote gaming environment to which users connect over a wide area network, such as the Internet. For example, the game service could utilize a series of servers, or a series of server farms located throughout the world to host video games. Players then connect to the gaming service using a variety of different client devices including game consoles, smartphones, tablets, personal computers, and other computing devices.

Embodiments of the present invention monitor characteristics of the game service compute usage to determine whether computing resources should be added or subtracted from the game service. A game service may host multiple instances of the same game along with instances of other games. Each instance of the game runs in a game session. The game session runs the video game code responsible for creating the playing experience for the users. Different parts of the game service may be allocated to run game sessions for a specific game title. The monitoring and allocation of resources may be done on an overall basis at the game service level, to part of the game service on a title-by-title basis level, or a combination.

The game session runs a video game title accessed by one or more players. Embodiments of the present invention run game titles that are written for the game service. Titles written for the game service do not use code to manage server resources or other remote computing resources.

Instead, the computing resources allocated to the game service are dynamically updated in response to changes in game service compute characteristics.

Various characteristics of the game service may be monitored and used to allocate computing resources. Usage of computing resources, such as central processing unit ("CPU") may be monitored directly. In another embodiment, the number of active game sessions running are monitored and computing resources are reallocated dynamically as the number of game sessions increases or decreases. The number of game sessions that causes a reallocation of computing resources may vary depending on the game titles running in the game sessions. In one embodiment, the number of game sessions associated with a certain unit of computing resources is editorially established and saved in an allocation table. For example, a first title may use one unit of computing resources per game session. Thus, every time an additional game session is added to the game service, an additional unit of computing resources would be added to the game service.

When a game session ends, the computing resources may be recycled to other game sessions running the same title. Recycling to the same title allows the machine to run the game without the game code needing to be reloaded onto the machine. When only a chunk of a game title, such as a level, is loaded into a machine's active memory, then the computing device may be recycled to a game session running the same level.

Further, the health of the game session or computing resources associated with the game session may be monitored. In one embodiment, computing resources showing unhealthy characteristics, such as slower than expected processing times, are removed from the game session and healthy resources are added.

A unit of computing resources may be demarked by a physical machine or a virtual machine. In one embodiment, an additional server, which is a physical machine, is allocated to a game session as a computing unit. In this case, the physical server has a one-to-one relationship with the computing unit or resource. In another embodiment, virtual machines are used. A virtual machine artificially segregates a single physical computing device into two or more virtual machines. Each virtual machine is able to carry out the capabilities of a full server but shares the capacity of the CPU and other components of the hardware device with one or more additional virtual machines. In one embodiment, a single real or virtual machine hosts multiple games sessions.

The capacity of a real or virtual machine may differ. Thus, physical or virtual machines of different sizes may be assigned to a game service. The game service may select a computing resource having a first capacity or a second capacity for various game titles as needed. A game session for a first game title may run on a server having a first capacity and a game session for a second game title may run on a server having a second capacity. In one embodiment, a game session uses several virtual machines. In another embodiment, a single virtual machine runs multiple game sessions.

In addition to managing the computing resources by adding and subtracting computing resources to a game service as needed, network resources may also be managed by the game service to facilitate communications between the client devices and the game session. Thus, as additional computing devices are allocated to a game service, the network resources may be updated to route communications appropriately to the computing devices on which the game service is running.

When allocating new resources to a game service, the resources may be selected for their proximity to the computing resources already serving the game service. For example, in a game service running over multiple server farms, a computing resource located within the same server farm may be favored over a computing resource in a different server farm. Similarly, a server with close proximity within a rack or virtual relationship with the machines already part of the game session may be preferred over those having a less proximate relationship. Computing resources may be recycled from an active game session that ends to an active game session running the same title, perhaps at the same game stage.

The client devices connected to the game session may play different roles for different games. In one embodiment, the client devices only send control signals to the game session. The game code running in the game session processes the control signals to change the game state. For example, a player or object within a game may move in response to the control input. The game instance may generate a rendered video game image that reflects the updated game state and communicate the rendered image to one or more clients connected to the game instance running in the game session. Each client may receive different rendered video game images from the perspective of the player associated with the client. Though described as a client from the perspective of the game service, the client could be a server to other computing devices. For example, a computing device within a residence could serve game content to other computing devices, including tablets or smartphones over a local area network.

In another embodiment, game geometry and other game information is sent from the server and combined with image data resident on the client to generate a rendered video game image on the client device. Other divisions of processing between the client and game service are possible.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Online Gaming Environment

Figure 2:
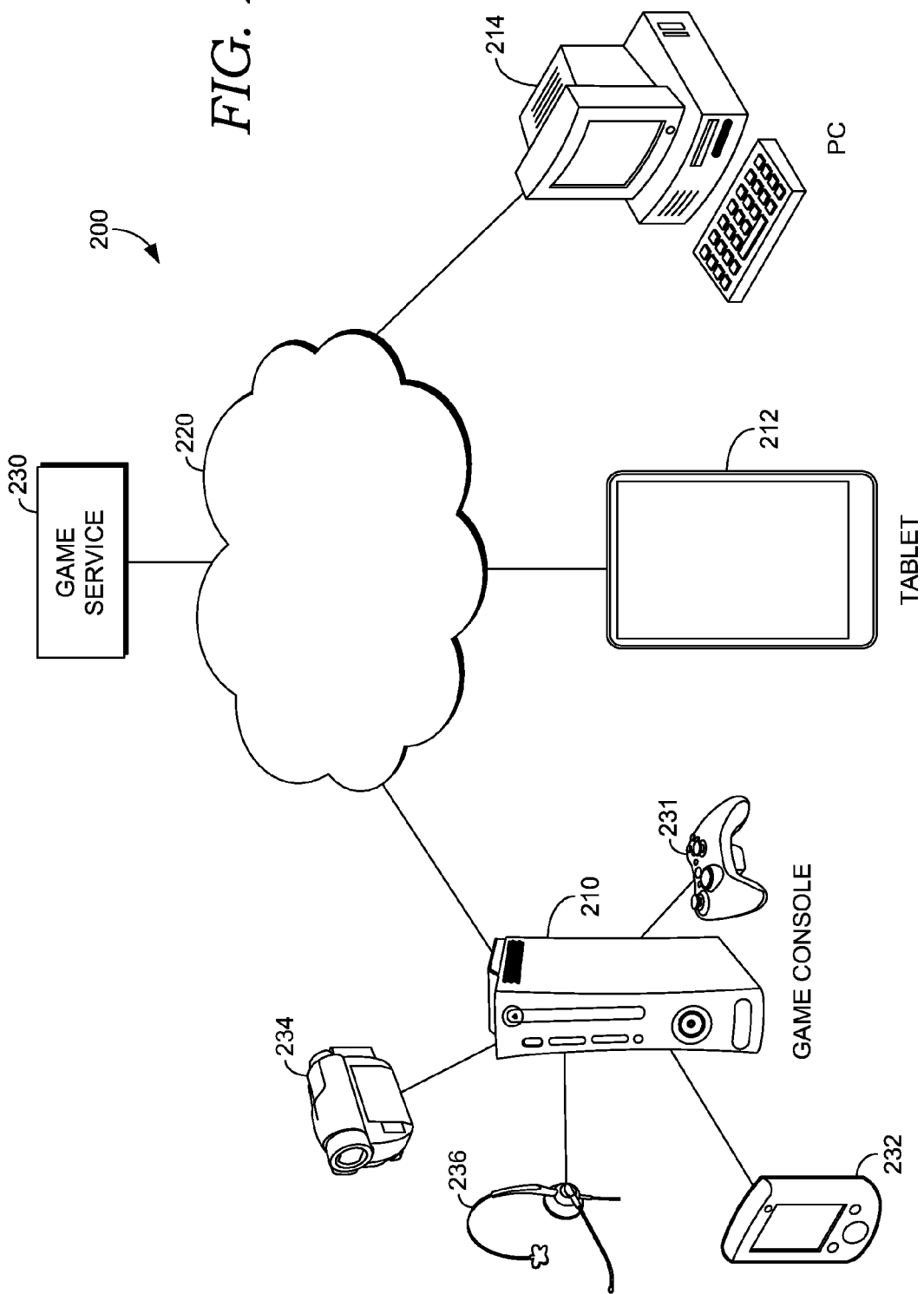
FIG. 2 is a diagram of an online gaming environment, in accordance with an embodiment of the present invention.

Turning now to FIG. 2, an online gaming environment 200 is shown, in accordance with an embodiment of the present invention. The online gaming environment 200 comprises various game clients connected through a network 220 to a game service 230. Exemplary game clients include a game console 210, a tablet 212, and a personal computer 214. Use of other game clients, such as smart phones, are also possible. The game console 210 may have one or more game controllers communicatively coupled to it. In one embodiment, the tablet 212 may act as an input device for a game console 210 or a personal computer 214. In another embodiment, the tablet 212 is a stand-alone game client. Network 220 may be a wide area network, such as the Internet.

The controllers associated with game console 210 include game pad 231, tablet 232, headset 236, and depth camera 234. A game console may be associated with control devices that generate both a rich input and a basic input. Individual controllers are capable of generating different kinds of inputs and a single controller could generate both a rich input and an basic input.

The game pad 231 may be capable of generating basic control signals, such as those generated by button selections and joystick movement. Movement data such as that generated by accelerometers and gyros within the game pad 231 may be examples of rich sensory data. In some implementations, the movement data is not considered a rich sensory data.

The tablet 232 can be both a game controller and a game client as mentioned previously with tablet 212. Tablet 232 is shown coupled directly to the game console 210, but the connection could be indirect through the Internet or a subnet. In one embodiment, the game service 230 helps make a connection between the tablet 232 and the game console. The tablet 232 is capable of generating numerous input streams and may also serve as a display output mechanism. In addition to being a primary display, the tablet 232 could provide supplemental game information near information shown on a primary display coupled to the game console 210, or simply be a control surface. The input streams generated by the tablet 232 include video and picture data, audio data, movement data, touch screen data, and keyboard input data.

The headset 236, captures audio input from a player and the player's surroundings and may also act as an output device if it is coupled with a headphone or other speaker.

The depth camera 234 generates a depth cloud used as a control input. The depth camera 234 may an use infrared camera to determine a depth, or distance from the camera for each pixel captured. Stereoscopic depth cameras are also possible. In addition, the depth camera 234 may capture a typical color stream or picture. The depth camera 234 may have several image gathering components. For example, the depth camera 234 may have multiple cameras.

Game service 230 may comprise multiple computing devices communicatively coupled to each other. In one embodiment, the game service 230 is implemented using one or more server farms. The server farms may be spread out across various geographic regions including cities throughout the world. In this scenario, the game clients may connect to the closest server farms. Embodiments of the present invention are not limited to this setup.

The game service 230 allows the game to be executed within the computing devices provided by the game service 230. A communication session between the game service and game clients carries input traffic to the game service 230 and returns a rendered game image and/or other game output.

Exemplary Game Client and Game Service for Remote Gaming

Figure 3:
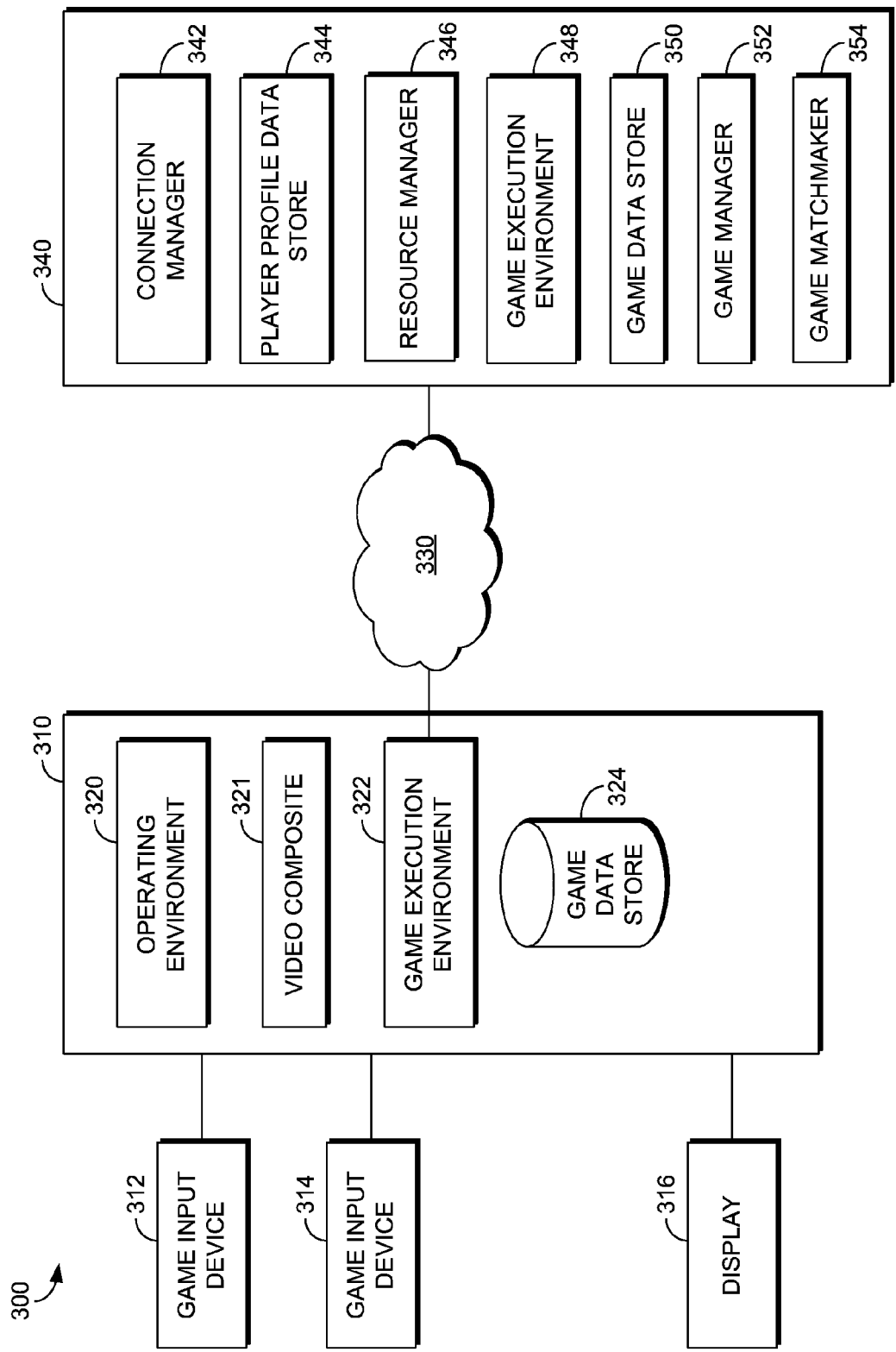
FIG. 3 is a diagram of a remote gaming computing environment, in accordance with an embodiment of the present invention.

Turning now to FIG. 3, an exemplary remote gaming environment 300 is shown, in accordance with an embodiment of the present invention. The remote gaming environment 300 includes a game client 310 communicatively coupled to a game server 340 through a network 330. In one embodiment, the network may be the Internet. The game client 310 is connected to a first game input device 312, a second game input device 314, and a display 316. Exemplary game input devices include game pads, keyboards, a mouse, a touch pad, a touch screen, a microphone for receiving voice commands, a depth camera, a video camera, and a trackball. Embodiments of the present invention are not limited to these input devices. The display 316 is capable of displaying video game content. For example, the display 316 may be a television or computer screen. In another embodiment, the display 316 is a touch screen integrated with the game client 310.

The game client 310 is a computing device that is able to execute video games. The game client 310 could be a tablet or a laptop computer. In another embodiment, the game client 310 is a game console and the display 316 is a remote display communicatively coupled to the game console. The game client 310 includes an operating environment 320, a video composite component 321, a game execution environment 322, and a game data store 324. Other components of the game client 310 are not shown for the sake of simplicity.

The operating environment 320 may be provided by an operating system that manages the hardware and provides services to applications running on the game client 310. The operating environment may allocate client resources to different applications as part of game and communication functions.

The game data store 324 stores downloaded games, game samples, and/or partially downloaded games. Games may be downloaded in playable blocks. To play a game, the game may need to be loaded from the game data store 324 into active memory associated with the game execution environment 322. The game data store 324 may also store player progress files.

The game execution environment 322 comprises the gaming resources on the client 310 required to execute instances of a game or part of a game. In some embodiments, the client 310 does not include a game execution embodiment or the computing resources to execute the game. The game execution environment 322 comprises active memory along with computing and video processing resources. The game execution environment 322 receives gaming controls and causes the game to be manipulated and progressed according to game programming. In one embodiment, the game execution environment 322 outputs a rendered video stream that is communicated to the display 316. The game execution environment 322 may execute part of a game to generate game images that are combined with rendered images received from the game server 340 by the video composite component 321

The video composite component 321 merges rendered video game images received from the game server 340 with rendered video game images rendered by the client 310 to form a single image that is output to display 316. Rendered video game images could refer to just a single color image or the color image and depth buffer data that is used to successfully composite server and client images. The video composite component may perform scaling and other functions to generate a video output that is appropriate. Some embodiments of the present invention do not use or comprise a video composite component 321.

The game server 340 comprises a connection manager 342, a player profile data store 344, a resource manager 346, a game execution environment 348, a game data store 350, a game manager 352, and a game matchmaker 354. Though depicted as a single box, the game server 340 could be a server farm that comprises numerous machines, or even several server farms. Several of the servers could act as clients for a central server that coordinates the game experience.

The connection manager 342 builds a connection between the client 310 and the server 340. The connection manager 342 may also provide various authentication mechanisms to make sure that the user is authorized to access the game service provided by the server 340. The connection manager may provide security, encryption, and authentication information to servers and virtual machines as they are added to a game session. The connection manager 342 may also analyze the bandwidth available within a connection and provide this information to components as needed. For example, the resolution of the video game image may be reduced to accommodate limited bandwidth.

The player profile data store 344 may work in conjunction with the connection manager 342 to build and store player information. Part of the player profile may comprise demographic and financial information such as a player's name, address and credit card information or other mechanism for paying for or purchasing games and experiences provided by the game service.

In addition, the player profile data store 344 may store a player's progress within an individual game. A player's score, achievements, and progress through game levels may be stored. Further, the player profile data store 344 may store information about individual player preferences such as language preferences. The player may access the game level information from multiple clients. For example, the player's progress could be accessed from a friend's game console or on the player's mobile device.

Information regarding a player's game client and speed of the network connection may also be stored in the player profile data store 344 and utilized to optimize the gaming experience. For example, in one embodiment, when a geographically proximate server farm is busy, players with higher latency Internet connections may be preferentially connected to proximate server farms while players with lower latency connections may be connected to server farms that are further away. In this way, the players with the network connections that are best able to handle the additional latency are connected to server farms that create additional latency because of their location.

The player profile data store 344 may also store a usage history for the individual player. A player's history of purchasing games, sampling games, or playing games through a game service that does not require the purchase of the games may be stored.

Resource manager 346 monitors a game service's computer resource usage and allocates computing resources as needed when characteristics of the computer usage change. In one embodiment, each game title has a dedicated resource manager 346 responsible for allocating computing resources within the game service to the game title. As more game sessions running the game title are added, more computing resources may be allocated to the part of the game service responsible for the game title. In another embodiment, a resource manager 346 monitors multiple game titles, including game titles associated with different development or publishing entities, and allocates the computing resources as needed. As more game sessions are detected across multiple game titles, additional computing resources are allocated to the game service. The resource manager 346 may allocate computing resources according to needs that vary by video game title. For example, different video game titles may require machines with different capabilities.

As explained in more detail, the resource manager 346 may monitor how many active game sessions are ongoing, how many compute units are actively running the active game sessions, and how many compute units are on standby. Standby compute units are allocated to the game service, or part of the game service, but are not actively supporting a game session. As the number of sessions within a game service increases or decreases, computing resources may be automatically added to or subtracted from the game service. In one embodiment, computing resources are added as various thresholds are crossed. The thresholds are established to optimize computing resources allocated to the game service. The threshold may be on a per-game-title basis, or for the entire service, or for both. For example, computer resources may be added when eight, sixteen, thirty-two, sixty-four, and ninety game sessions are active. Each threshold may be associated with adding a different amount of additional computing resources. The amount of computing resources added may not be linear. The relationships between game session threshold and computing resources may be established and stored in a table that is used by resource manager 346 to determine when and how much computing resources should be added to the game service or the part of the game service that is responsible for a game title. In addition to storing such thresholds in a table, an algorithm may be employed based on observed usage patterns to determine how many computing resources are needed by the game service.

When managing computing resources and creating new game sessions, the resource manager 346 may recycle a computing resource from another game session running the same title. The computing resource is recycled in the sense that the game code does not need to be reloaded into active memory. Instead, new game state information can be provided and the already-loaded code may be used in the new game session with new players.

The game execution environment 348 comprises the gaming resources required to execute instances of a game. These are the resources described previously that are managed by the game manager 352 and other components. The game execution environment 348 comprises active memory along with computing and video processing. The game execution environment 348 receives gaming controls, such as reduced controller input, through an I/O channel and causes the game to be manipulated and progressed according to its programming. In one embodiment, the game execution environment 348 outputs a rendered video stream that is communicated to the game client. In other embodiments, the game execution environment 348 outputs game geometry, or other representations, which may be combined with local objects on the gaming client to render the gaming video.

The game data store 350 stores available games. The games may be retrieved from the data store and loaded into active memory for use in a game session. The game data store 350 may be described as passive or secondary memory. In general, games may not be played off of the game data store 350. However, in some embodiments, the secondary memory may be utilized as virtual memory, in which case portions of the game data store 350 may also serve as active memory. This illustrates that active memory is not necessarily defined by a particular hardware component, but is defined by the ability of the game resources to actively manipulate and access objects within the memory to execute the game.

The game manager 352 manages players' connections to active games. In one embodiment, there are individual game managers for each game available through the game service. Taking a single game as an example, the game manager will drop players into requested games. In one embodiment, a player may connect to a game through the game manager 352. In other words, the game manager 352 may act as a gatekeeper for communications and connections between individual game instances. When a player drops out of a game, an instruction may go to the game manager 352 to retrieve and save the player's progress into the player's profile within player profile data store 344.

The game matchmaker 354 tracks ongoing game sessions and helps player find a game session to join. The game matchmaker 354 may generate an interface that allows prospective players to search for game sessions in which a friend is participating. The matchmaker 354 may allow players to search for active game sessions having players with similar skill levels, for example, as indicated by player rank, game progress, or achievements obtained within a game. In one embodiment, the matchmaker 354 only returns game sessions having space available for more players.

In another embodiment, the matchmaker 354 may return a list of currently closed game sessions with an estimated wait the player can expect before an opening is available. The wait may be calculated by analyzing churn for the session. The churn measures the rate at which players leave the game session. The churn may be calculated using an average for all game sessions of the same game title. The churn may be specific to the particular game session. Wait time may also take into consideration other players waiting to join. Thus, if four players were waiting to join a session that averages an opening every 30 seconds, then the estimated wait time would be two minutes. The matchmaker 354 may manage a queue of players waiting to join a game and add them to the game as openings become available.

The matchmaker 354 may also generate a list of open game sessions for a player to join. The list may be filtered, even without the prospective player's input, to only list sessions with similar level players or that are otherwise appropriate for the prospective player. For example, only game titles the player has a license to play may be listed. In another embodiment, all games are listed, but an indication lets the player know which games will require purchase of an additional license. The players are given the opportunity to buy a license to play a game through the interface.

The matchmaker 354 may make an effort to keep game sessions full, while killing others, by manipulating the game sessions listed for new players to join. Players are directed to game sessions in a way that minimizes the overall use of computing resources. For example, an effort may be made to keep game sessions full of players instead of having twice as many half-full game sessions. Thus, if a game session is near a threshold number of players where computing resources could be removed, then that game session may not be listed, unless responsive to a specific query for another player or other sought out characteristics unique to that session. This allows the game session to fall below the threshold and for resources to be removed. On the other hand, game sessions with only a few openings may be listed first in an effort to keep the game session full.

Thus, the matchmaker 354 provides search tools to help players find an open game session that meets their needs. When multiple games sessions meet the player's needs, the player may be added to game sessions in a way that minimizes the total number of game sessions running at a given time.

The matchmaker 354 may also select game sessions for player to conserve network resources and provide a better game experience. The matchmaker 354 may look at characteristics of the players' local capabilities for selecting appropriate game session computing resources. As an example, the type of console or the version of the game the player is using may influence which computing resources are selected to run a game session. Further, the player's geographic location influences which data center the player is connected to, in order to minimize network latency. The matchmaker 354 will prioritize connection to game sessions running in the preferred data center. In general, geographically closer data centers will have less latency, but network conditions may vary. In one embodiment, the network conditions are monitored and a player is matched with a game session running in a data center that has the least latency for the specific player.

Figure 4:
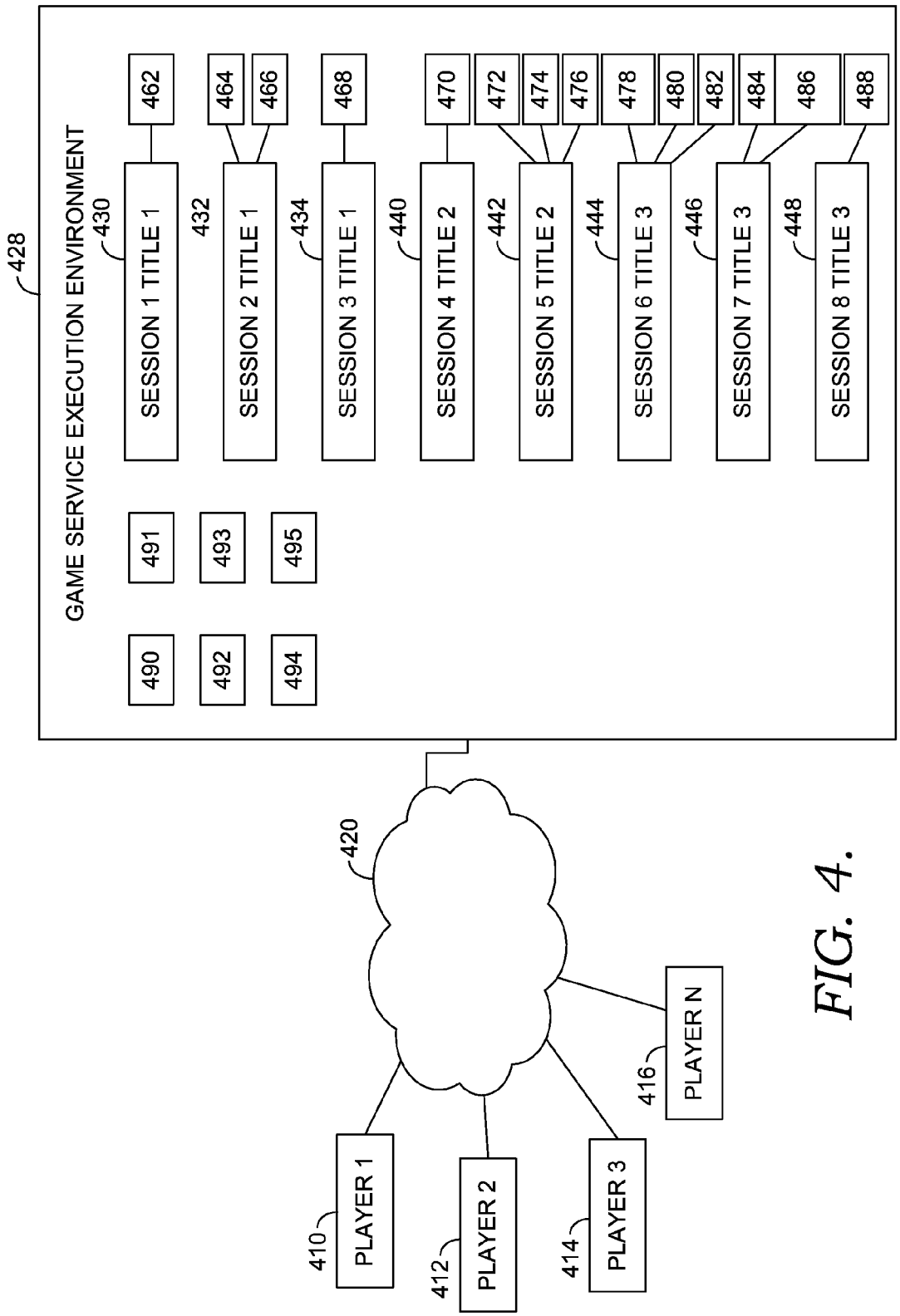
FIG. 4 is a diagram of a game execution environment that is running active game sessions with active and standby computing resources, in accordance with an embodiment of the present invention.

Turning now to FIG. 4, a game execution environment 428 that is running active game sessions with active and standby computing resource allocation, is illustrated in an accordance with an embodiment of the present invention. The game execution environment 428 may be similar to the game execution environment 348 described previously. The game execution environment 428 is part of a game service, such as described previously with reference to FIGS. 2 and 3. For the sake of simplicity, other components within the game service are not shown. The game execution environment 428 is connected to various game clients through network 420. Some of the clients may be other servers, while other clients are game consoles. As mentioned previously, other components, such as authorization and connection management components and game managers, may route communications between the network 420 and the game execution environment 428.

As can be seen, player 1 on client device 410, player 2 on client device 412, player 3 on client device 414, and player N on client device 416 are connected to the game execution environment 428 through network 420. Player N is intended to illustrate that any number of players might be remotely connected to the execution environment. Many of the connected players and clients are not shown for the sake of simplicity. As mentioned previously, when players are connected, their player profile information and other I/O channel details may be incorporated into the active game to allow them to play the game.

The game execution environment 428 comprises eight sessions. Each session has computing resources allocated to it. The first session 430 is running title one. Computing resource 462 is allocated to session 430. Computing resource 462 may be a single machine, or a virtual machine.

The second session 432 is also running title one. Session 432 is associated with computing resource 464 and computing resource 466. In this example, computing resource 464 and computing resource 466 have the same capacity. That does not need to be the case as will be illustrated subsequently.

The third session 434 is also running title one. Session 434 is associated with computing resource 468.

The fourth session 440 is running a second video game title. Title two is different from title one. Computing resource 470 is allocated to game session 440.

The fifth session 442 is also running title two. Computing resource 472, computing resource 474, and computing resource 476 are all allocated to session 442. As can be seen, three resources are allocated to session 442 and one resource is allocated to 440. Different game sessions may use computer resources for various reasons. For example, different number of players in the respective sessions may cause different amounts of computer resources to be allocated.

The sixth session 444 is running title three. Title three is different from title one and title two. As mentioned previously, the thresholds of players used to allocate resources may differ from title to title. Further historical usage patterns may be monitored to allocate resources on a per-title basis. For example, titles that commonly attract large numbers of players may start out with more resources. This is indicated by the larger size of computing resource 478, which is allocated to the sixth session 444. A smaller computing resource 480 is also allocated to the sixth session 444. Thus, computing resources of different size may be allocated to game sessions when appropriate.

The different size may reflect the size of virtual machines or physical machines that have a different computing capacity. Computing resource 482 is also associated with the sixth session 444 and is the same size as computing resource 480. This illustrates that a game title may initially start with a larger computing capacity but could be incrementally increased using smaller-sized computing resources.

The seventh session 446 is also running title three. Computing resource 484 and computing resource 486 are allocated to the seventh session 446. As can be seen, computing resource 486 is larger than computing resource 484.

The eighth session 448 is running title three. Computing resource 488 is allocated to the eighth session 448.

In addition to the computing resources associated with active game sessions, a group of standby resources are allocated to the game service. The standby resources are not associated with an active game session or particular title. In another embodiment, the standby resources are pre-allocated to a particular game title or game developer. The standby computing resources include resources 490, resource 491, resource 492, resource 493, resource 494, and resource 495.

Figure 7:
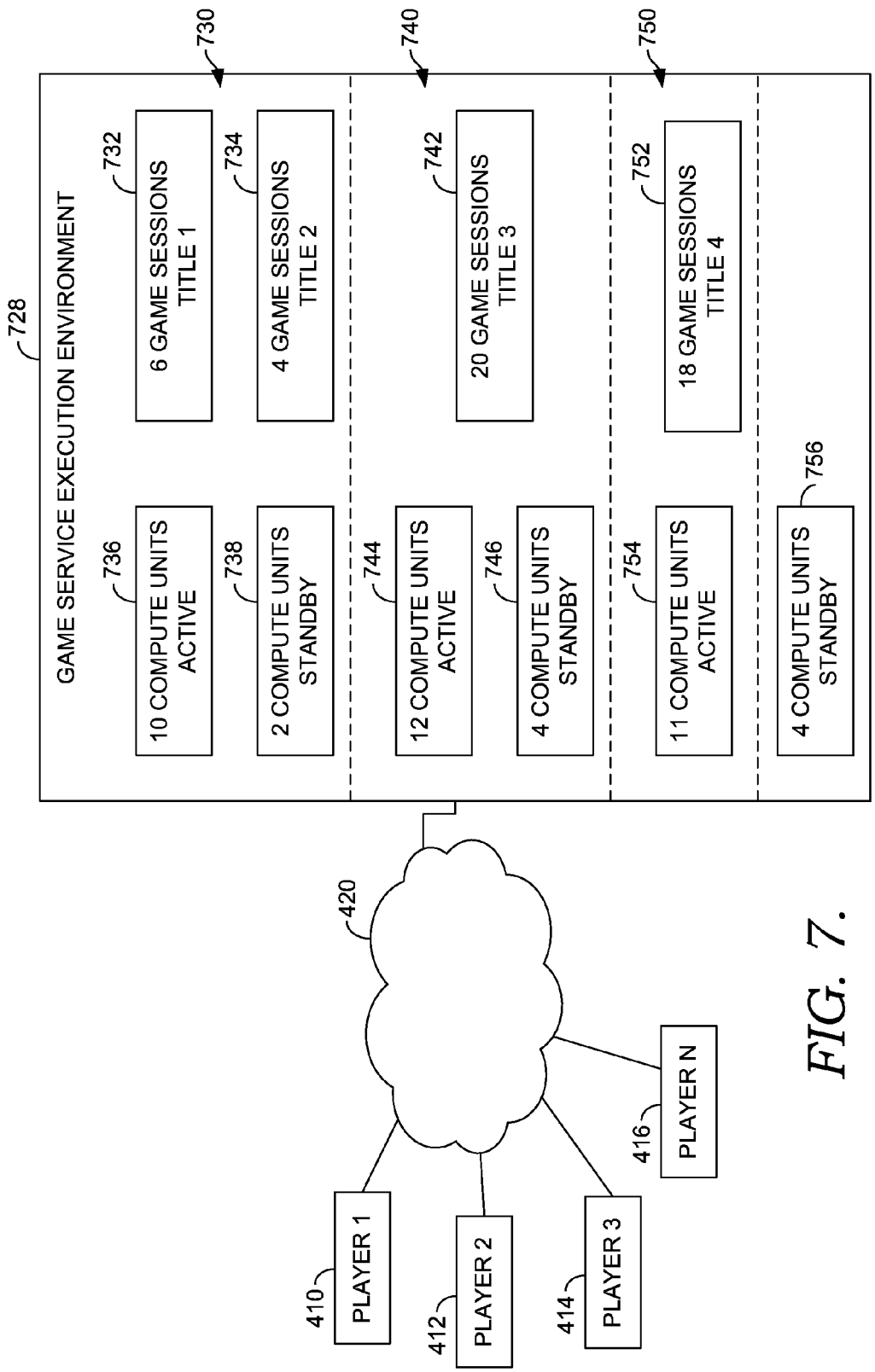
FIG. 7 is a diagram that illustrates monitoring standby computing resources on a title-by-title basis in a game execution environment, in accordance with an embodiment of the present invention.

In one embodiment, the number of active game sessions are monitored and compared to a threshold. The threshold may be a percentage of the total game sessions the computer resources allocated to the game service can handle. Different game sessions may require different amounts of computer resources due to the title running, players in the session, and other factors. The threshold may be based on the computer resources needed to run an average session. When computer resources are monitored on a game-title basis, as shown in FIG. 7, different thresholds could be used for different titles.

Figure 5:
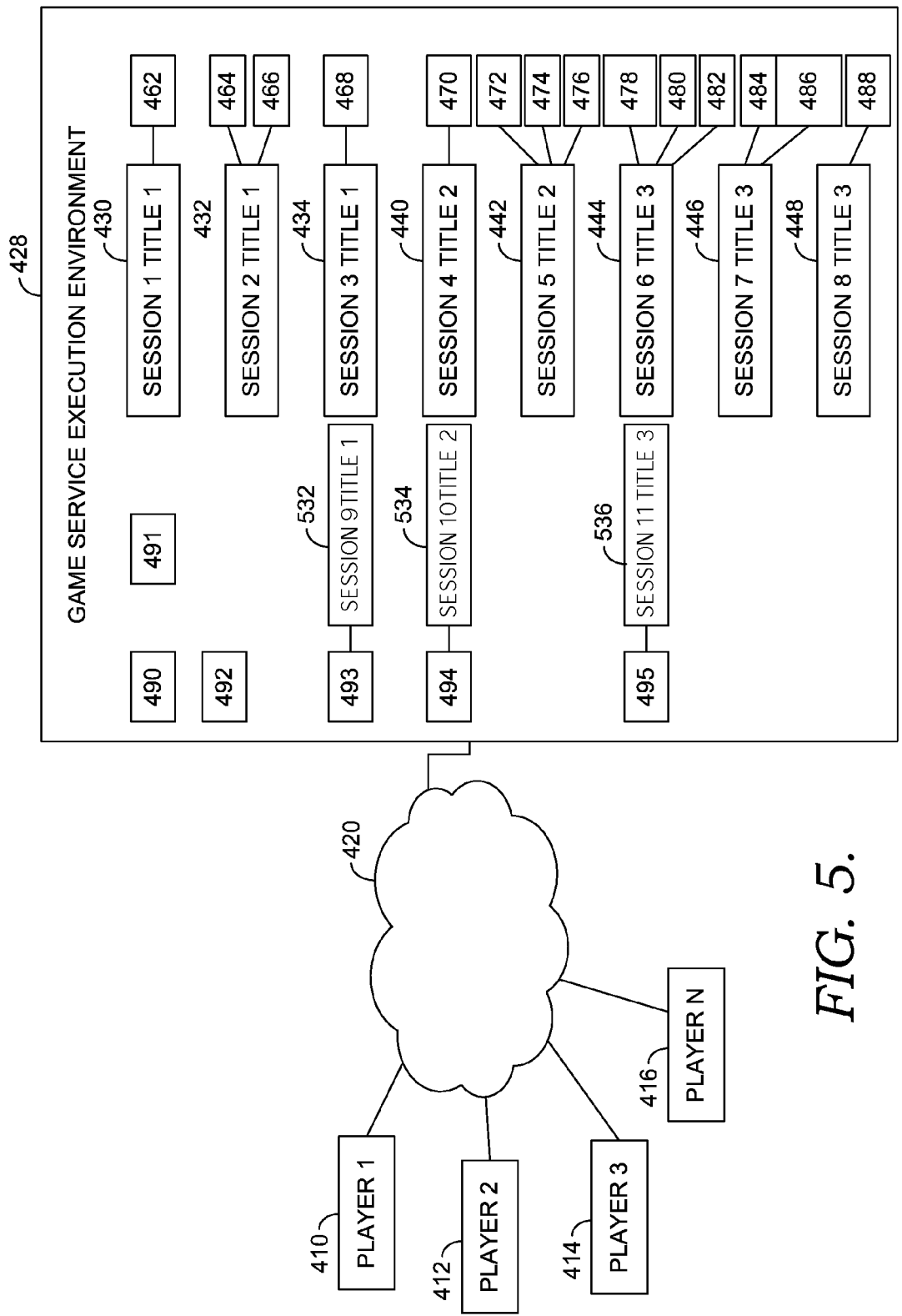
FIG. 5 is a diagram that illustrates reallocation of standby computing resources in response to new game sessions in a game execution environment, in accordance with an embodiment of the present invention.

Turning now to FIG. 5, a gaming execution environment 428 with updated computing resources allocated to new game sessions is shown, in accordance with an embodiment of the present invention. Though not shown in FIG. 5, the game execution environment 428, and specifically sessions within the environment 428 are monitored by a resource manager, such as resource manager 346 described previously with reference to FIG. 3.

In FIG. 5, all of the sessions described previously with referenced to FIG. 4 are the same except that three new sessions have been added. The ninth session 532 is running title one and is associated with computing resource 493. The tenth session 534 is running title two and is associated with computing resource 494. The eleventh session 536 is running title three and is associated with computing resource 495. Resources 493, 494, and 495 were previously a standby resource. After the resources were allocated to new game sessions, only three standby resources remained for use with any new game sessions that may be needed. For this example, having only three standby resources falls below the threshold causing more computing resources to be allocated to the game service.

Figure 6:
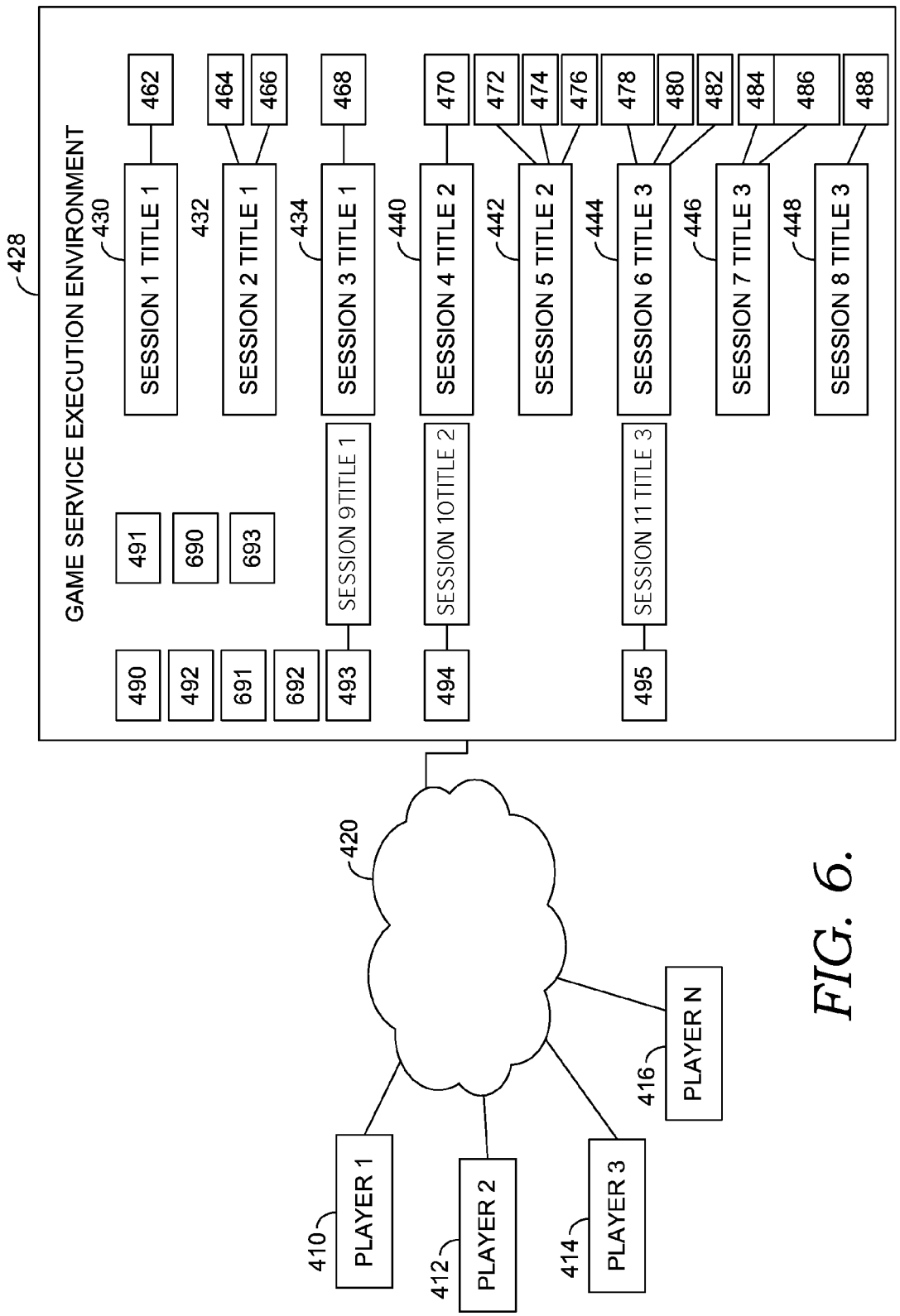
FIG. 6 is a diagram that illustrates replenishment of standby computing resources in a game execution environment, in accordance with an embodiment of the present invention.

Turning now to FIG. 6, a game execution environment 428 with updated standby computer resources is shown, in accordance with an embodiment of the present invention. The sessions are the same as those shown previously with reference to FIG. 5. However, four new computer resources have been allocated to the game service and are on standby. The new resources include resource 690, resource 691, resource 692, and resource 693. Notice that four resources were added to create a total of seven standby resources instead of the original six in FIG. 4. The total number of computer resources on standby may change as play conditions change. For example, if resource demands on the game service are growing (the number of active game sessions is increasing) during a particular time in the day, more resources may be on standby to be ready to handle the growth. On the other hand, if demand is decreasing, then fewer resources may be on standby since less margin may be needed.

Turning now to FIG. 7, a diagram of a gaming service 728 that allocates computing resources on a game-title-by-game-title basis is shown, in accordance with an embodiment of the present invention. The gaming service 728 is divided into three different monitoring groups. Monitoring groups may be formed for a variety of reasons. In one embodiment, each game title is assigned a monitoring group. The monitoring group associated with the game title would include the computing resources needed to run the game title's active gaming sessions. In another embodiment, monitoring groups are organized by game developer or publisher. A game developer may write games that use similar computing resources. It may be advantageous to group game sessions running the developer's titles together. In some cases, developers may wish to have their own customized online experience that is facilitated by having dedicated computing resources in the same monitoring group. Further, monitoring groups may be formed based on game title and location. For example, all game sessions running a game title in a first data center may form a first monitoring group, while game sessions running the same title in a second data center form a second monitoring group. Other game characteristics or resources may be used in isolation or in combination to form an advantageous monitoring group.

Monitoring group 730 includes game sessions running two different titles. Monitoring group 730 is a multi-title monitoring group. The two titles within monitoring group 730 may be associated with the same publisher or grouped together for some other reason. Session group 732 includes six game sessions running game title one. Session group 734 includes for game sessions running title two. Within monitoring group 730, the active resource group 736 includes 10 computing units. In addition, a standby group 738 includes two computing units. The active computing units are shared between the game titles. In this example, there is a one-to-one relationship between active computing units and active game sessions, but that does not need to be the case. As new game sessions for title one or title two become active, the standby resources may be allocated to the new sessions and new computing resources allocated to monitoring group 730.

Monitoring group 740 is associated with a single game title. Active sessions group 742 includes 20 game sessions of title 3. The second monitoring group 740 includes an active resource group 744 with 12 computing resources. The standby group 746 includes four computing units.

Monitoring group 750 also includes a single game title. The active sessions group 752 includes 18 game sessions of title four. The active resource group 754 includes 11 computing units. There are no standby units associated with the monitoring group 750. However, additional resources 756 are available to the game service generally. These four computing resources could be allocated to different monitoring groups as needed. In one embodiment, specialized computing resources are allocated to monitoring groups that utilize them. Monitoring groups that utilize default computing setups may share a standby pool. Additionally, the monitoring group 750 may not have standby computing resources directly allocated because demand for title four is decreasing. When demand for a game title is decreasing fewer standby resources may be allocated to the associated monitoring group than when demand for the game title is increasing. Session churn, a measure of how many sessions are being initiated and deactivated during a time, may also be used to determine a threshold for allocating compute resources to a monitoring group.

Figure 8:
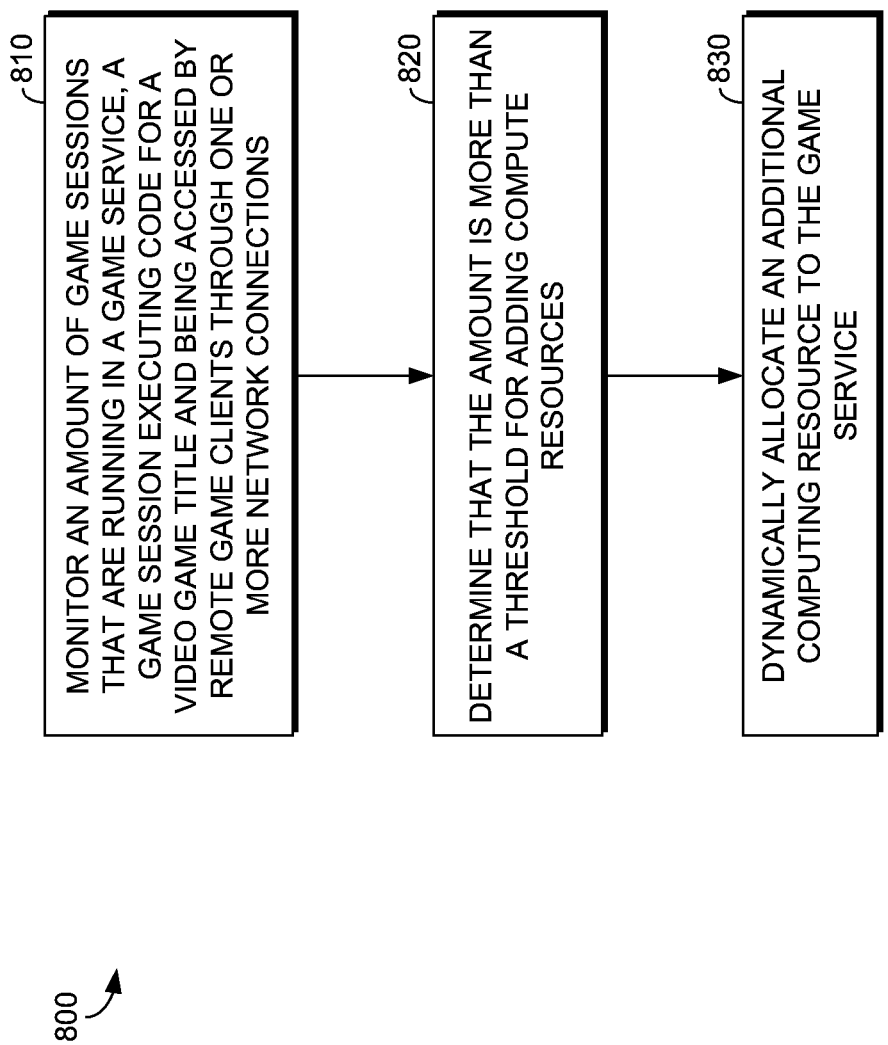
FIG. 8 is a flow chart showing a method of managing computing resources allocated to a remote game service, in accordance with an embodiment of the present invention.

Turning now to FIG. 8, a method 800 of allocating computing resources to a remote gaming service is shown, in accordance with an embodiment of present invention. As explained previously, the remote game service provides a platform for online gaming. The game service may use multiple servers, and even multiple server farms to provide the service. A game session runs a single video game title and may include multiple players. The players connect to the game service using clients that connect to the game service hardware over a wide area network, such as the Internet. In one embodiment, the game session and the game code within the game session does not have the capability to monitor or allocate computing resources to the game session, to the game service, or within the game service. The game code is written to be agnostic regarding the computer resources used to run it. Instead, the game code is written against a game session that has computing resources allocated to it by a resource manager as described previously with reference to FIG. 3. The resource manager may monitor game sessions running different titles or be dedicated to a single title.

At step 810, an amount of game session running on a game service is monitored. The game sessions are executing code for a video game title and being accessed by remote game clients through one or more network connections. The game service may have game sessions each running a different title.

At step 820, the amount of active game sessions is determined to satisfy a threshold criterion for adding more resources to the game service. As mentioned, the threshold may be based on a percentage of resources being used to run active sessions. The threshold may change as demand changes and the rate of demand changes. In general, threshold may change to create more standby resources when demand changes and when the rate of change is high.

The threshold is less than total capacity for the hardware components allocated to the game service. Embodiments of the present invention may monitor any hardware component identified as a bottleneck to effective game play. In other words, the hardware component with the capacity that is consumed first during game play may be monitored as a trigger to allocate additional computing resources. Different games may stress or utilize the capacity of machines in different ways. Some games may be more graphically intensive and utilize more graphics resources while other games may be more network intensive due to the type of control signal received or the output density. For example, games utilizing richer control sources, such as audio control or image data, may consume network-interface capacity faster than they consume available CPU or graphics-processing capacity. The limiting factor may be determined and monitored on a title-by-title basis and the specific type of computing resource allocated as needed.

At step 830, additional computing resources are allocated to the game service. As mentioned, the computing resources allocated may be a physical device or a virtual device. Further, the computing resource allocated may be of a different size than the original computing resource and computing resources may be incremented in different amounts for different game titles. For example, relatively small amounts of computing resources may be allocated to game titles that typically do not see the number of game sessions change rapidly. In contrast, game titles with high game session churn rates (e.g., the number of game sessions being initiated and terminated) may expand more rapidly. Historical usage data may be mined to determine the optimum amount of resources to add to the service or to each game title. In one embodiment, physical computing resources are added in even CPU numbers. For example, two, four, or eight CPU's and associated resources could be added to a game service at one time.

Figure 9:
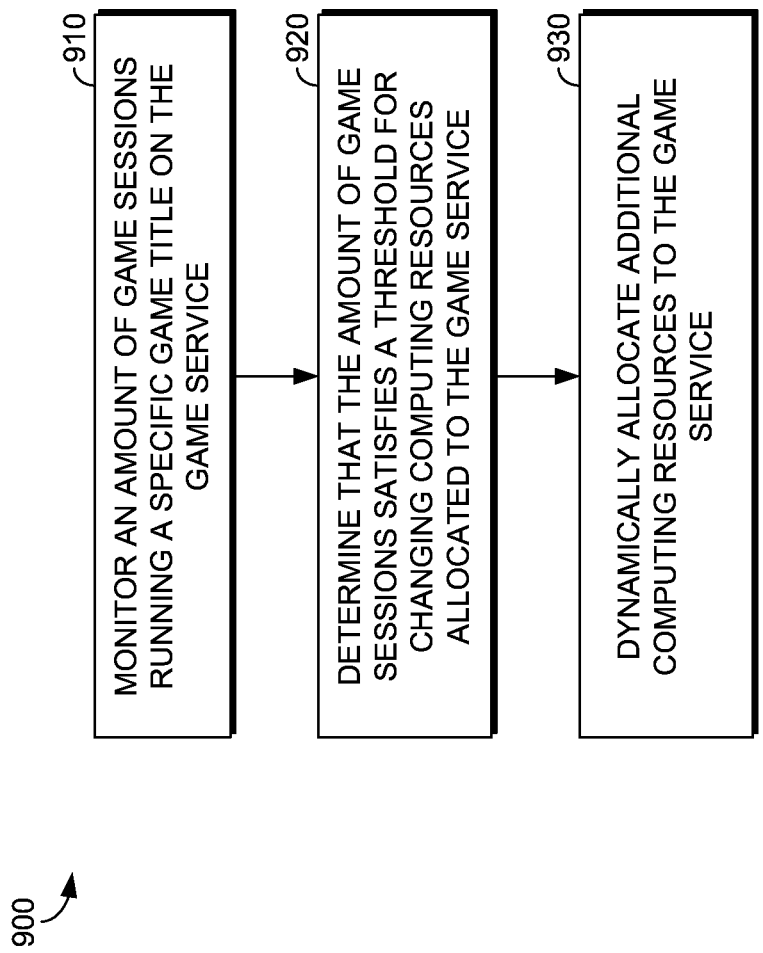
FIG. 9 is a flow chart showing a method of managing computing resources allocated to a remote game service, in accordance with an embodiment of the present invention.

Turning now to FIG. 9, a method 900 of allocating computer resources to a remote gaming service is provided, in accordance with an embodiment of the present invention. At step 910, an amount of game sessions running a specific game title on the game service is monitored. As mentioned, the game service provides video game titles that may be accessed remotely by players using their client devices, such as smartphones, tablets, and game consoles. In one embodiment, the monitoring is provided by the game service. The videogame code running within the game sessions may not monitor available resources.

At step 920, the amount of game sessions is determined to satisfy a threshold for changing computing resources allocated to the game service. The threshold may bound a high and low range of game sessions associated with different levels of computing resources. For example, when a low threshold is met, computing resources may be taken away from the game service. When a high threshold is met, additional computing resources may be added to the game service. At step 930, additional computing resources are dynamically allocated to the game service.

Figure 10:
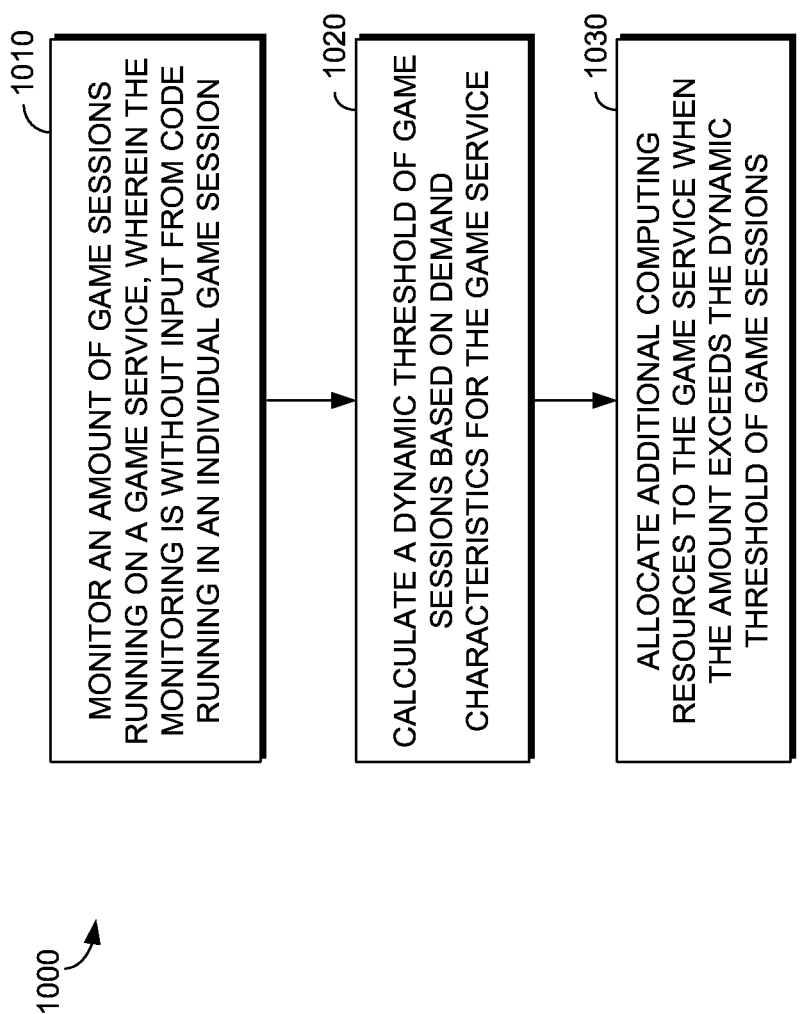
FIG. 10 is a flow chart showing a method of managing computing resources allocated to a remote game service, in accordance with an embodiment of the present invention.

Turning now to FIG. 10, a method 1000 of managing computing resources allocated to a remote game service is shown, in accordance with an embodiment of the present invention. At step 1010, an amount of game sessions running on a game service is monitored. The monitoring is without input from code running in the game sessions. In other words, the monitoring service or function is separate from the game code used to generate the game experience for the players. Additionally, multiple groups of gaming sessions are monitored, possibly across multiple video game titles. The groups of gaming sessions may be described as a monitoring group.

Step 1020, a dynamic threshold of game sessions is calculated based on demand characteristics for the game service. The dynamic threshold attempts to efficiently utilize computing resources by allocating enough resources for the player's game experience without having an abundance of unused computing resources. In one embodiment, they usage of the game service is not constant. Thus, the threshold is calculated to dynamically add and subtract computing resources from the gaming service.

In one embodiment, the demand characteristic is historical demand. Historical demand may indicate a normal range of game sessions for the game service at particular times. Historical information may also indicate a normal range of game sessions for a particular game title. Some game titles may be popular in the evening while other game titles are popular in the morning or afternoon. The historical information may be used to confirm real-time demand trends. If the current trend is a decreasing demand for game sessions of a specific title and this matches the historical trend during the same or similar time periods in the past than the threshold could be set with a higher confidence and less margin for error. In another embodiment, dynamic demand for a game title is used to calculate the threshold. Both the actual demand, as measured by active number of game sessions and a rate of demand change may be used to determine the threshold.

Given current demand and the current deployment times, for example six minutes, a forecast may be made to estimate what demand will be in six minutes. In other words, the analytical forecast estimates where demand will be at the time that any deployment actions taken presently will actually come into effect. The analytical forecast is based on "historic observations" of the last x amount minutes worth of historic data, to understand the profile and how traffic seems to be trending. "x" may be a threshold that varies based on different factors. For example, the threshold used may be based on deployment time. If deployment only takes a few minutes then the threshold may be on the order of a few minutes, but if resource deployment takes an hour then the threshold may be on the order of an hour. Based on this data, a polynomial matching the historic data points is computed using the least square method, and then extrapolated using that polynomial. This process may be described as forecasting. The forecasted number may be tuned based on historic data showing demand spikes from the last 24 hours, for example, to compute a safety margin.

In addition to forecasting demand, known spikes could be accounted for and used to temporarily override the demand forecast. An embodiment of the prevent invention supports configuration of limited time periods where a higher minimum threshold of resources is set in expectation of a popular event, like a game release date, availability of new content, contest or tournament, or bonus weekend. A demand interface may be provided that allows events effecting demand to be reported. The demand interface may be accessible to developers or game service administrators. The interface may allow the anticipated demand to specified. For example, demand could be specified as 1000 users will play this Tuesday at 7:00 PM. Alternatively, the event details, including time period, game title, and event category may be provided through the interface. The event details may be used to identify one or more similar events that occurred previously. The demand characteristics of the previous event(s) may be used to forecast demand for the game title during the time period when the event is occurring.

Demand may be recalculated at any time. As demand changes, resources may be moved away from pools with excess resources to pools with a resource shortage. Alternatively, the resources may be allocated away from the game service entirely and used for some other purpose in the data center. Embodiments of the invention allow a period of time between demand recalculation to be set editorially, for example every five minutes, to produce less or more aggressive allocation of resources.

At step 1030, additional computing resources are allocated to the game service when the amount exceeds the dynamic threshold of game sessions. Thus, the threshold is specific to the game title and may vary from game title to game title. The threshold may also vary from hour to hour and day-to-day as player's preferences and game usage changes.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media having computer-executable instructions embodied thereon that when executed by a computing device perform a method of allocating computing resources to a remote game service, the method comprising:
monitoring a count of all active game sessions of a plurality of game sessions of a game title provided by a game service and an amount of standby resources allocated to the game service running the plurality of game sessions of the game title on virtual machines, wherein each of the virtual machines is configured to host up to the plurality of game sessions, wherein the amount of standby resources is allocated to the game service but not being actively used by the all active game sessions, wherein each of the all active game sessions is associated with a different instance of the game title and configured to be accessed by up to a plurality of players;
determining that the amount of standby resources is below a threshold to the game service and the count of all active game sessions has increased; and
based on the determination that the amount of standby resources is below the threshold and the count of all active game sessions has increased, dynamically allocating an additional amount of resources to the standby resources, wherein the standby resources are included in a single standby pool of resources to be allocated to any of the plurality of game sessions as needed.

2. The media of claim 1, further comprising: determining a game title that is likely to use the additional amount of resources based on a demand for the game title increases faster than demands for other game titles provided by the game service.

3. The media of claim 1, further comprising:
determining that the count of all active game sessions are decreasing; and
in response to the amount of standby resources being below the threshold and the count of all active game sessions being decreased, dynamically recycling one or more standby resources to the game service.

4. The media of claim 1, further comprising: outputting a rendered game image to a game client connected to the game service.

5. The media of claim 1, wherein the threshold is adjusted based on a rate of change for present standby resources usage.

6. The media of claim 1, further comprising: receiving a request from a client to join the game service and automatically allocating network resources to route control communications from the client into the game service.

7. A method, comprising:
monitoring a count of all active game sessions of a plurality of game sessions of a game title provided by a game service and an amount of standby resources allocated to the game service running the plurality of game sessions of the game title on virtual machines, wherein each of the virtual machines is configured to host up to the plurality of game sessions, wherein the amount of standby resources is allocated to the game service but not being actively used by the all active game sessions, wherein each of the all active game sessions is associated with a different instance of the game title and configured to be accessed by up to a plurality of players;
determining that the amount of standby resources is below a threshold to the game service and the count of all active game sessions has increased; and
based on the determination that the amount of standby resources is below the threshold and the count of all active game sessions has increased, dynamically allocating an additional amount of resources to the standby resources, wherein the standby resources are included in a single standby pool of resources to be allocated to any of the plurality of game sessions as needed.

8. The method of claim 7, wherein the threshold is adjusted based on a rate of change for present standby resources usage.

9. The method of claim 7, further comprising: determining a game title that is likely to use the additional amount of resources based on a demand for the game title increases faster than demands for other game titles provided by the game service.

10. The method of claim 7, further comprising:
determining that the count of all active game sessions are decreasing; and
in response to the amount of standby resources being below the threshold and the count of all active game sessions being decreased, dynamically recycling one or more standby resources to the game service.

11. A system, comprising:
a processor; and
computer storage memory having computer-executable instructions stored thereon which, when executed by the processor, implement a method of managing computing resources allocated to a remote game service, the method comprising:
monitoring a count of all active game sessions of a plurality of game sessions of a game title provided by a game service and an amount of standby resources allocated to the game service running the plurality of game sessions of the game title on virtual machines, wherein each of the virtual machines is configured to host up to the plurality of game sessions, wherein the amount of standby resources is allocated to the game service but not being actively used by the all active game sessions, wherein each of the all active game sessions is associated with a different instance of the game title and configured to be accessed by up to a plurality of players;

determining that the amount of standby resources is below a threshold to the game service and the count of all active game sessions has increased; and based on the determination that the amount of standby resources is below the threshold and the count of all active game sessions has increased, dynamically allocating an additional amount of resources to the standby resources, wherein the standby resources are included in a single standby pool of resources to be allocated to any of the plurality of game sessions as needed.

12. The system of claim 11, wherein the threshold is adjusted based on a rate of change for present standby resources usage.

13. The system of claim 11, further comprising:
determining a game title that is likely to use the additional amount of resources based on a demand for the game title increases faster than demands for other game titles provided by the game service.

14. The system of claim 11, further comprising:
determining that the count of all active game sessions are decreasing; and
in response to the amount of standby resources being below the threshold and the count of all active game sessions being decreased, dynamically recycling one or more standby resources to the game service.

* * * * *